(12) United States Patent
Nagai et al.

(10) Patent No.: US 11,920,928 B2
(45) Date of Patent: Mar. 5, 2024

(54) SYSTEM AND METHOD FOR CORRECTING OPTICAL PATH LENGTH MEASUREMENT ERRORS

(71) Applicant: Tokyo Electron Limited, Tokyo (JP)

(72) Inventors: Kenji Nagai, Miyagi (JP); Hideaki Nagasaki, Miyagi (JP)

(73) Assignee: Tokyo Electron Limited, Tokyo (JP)

( * ) Notice: Subject to any disclaimer, the term of this patent is extended or adjusted under 35 U.S.C. 154(b) by 130 days.

(21) Appl. No.: 17/733,846

(22) Filed: Apr. 29, 2022

(65) Prior Publication Data
US 2022/0357146 A1 Nov. 10, 2022

(30) Foreign Application Priority Data

May 7, 2021 (JP) ................................. 2021-079034
Jan. 31, 2022 (JP) ................................. 2022-013030

(51) Int. Cl.
*G01B 9/02055* (2022.01)
*G01B 9/02015* (2022.01)

(52) U.S. Cl.
CPC ..... *G01B 9/02071* (2013.01); *G01B 9/02028* (2013.01); *G01B 2290/60* (2013.01)

(58) Field of Classification Search
CPC ............ G01B 9/02028; G01B 9/02057; G01B 9/0207; G01B 9/02071; G01B 2290/60; G01J 3/0286; G01J 3/26
See application file for complete search history.

(56) References Cited

U.S. PATENT DOCUMENTS

| 2012/0062870 A1* | 3/2012 | Yamawaku | G01B 9/02021 356/450 |
| 2012/0327394 A1* | 12/2012 | Matsudo | G01J 5/0007 356/43 |
| 2021/0102847 A1* | 4/2021 | Wu | G01J 3/427 |

FOREIGN PATENT DOCUMENTS

JP 2013-029487 A 2/2013

* cited by examiner

*Primary Examiner* — Michael A Lyons
(74) *Attorney, Agent, or Firm* — Studebaker & Brackett PC

(57) ABSTRACT

A system includes a first optical unit that emits light to a measurement target object and receives first interference light incident from the measurement target object, a second optical unit that emits the light to a reference object configured to have a constant optical path length with respect to a temperature fluctuation and receives second interference light incident from the reference object, a spectroscope connected to the first optical unit and the second optical unit and receives the first interference light and the second interference light to be incident, and a control unit connected to the spectroscope, and the control unit calculates a fluctuation rate of a measurement optical path length with respect to a reference optical path length under a predetermined temperature environment on the basis of the optical path length of the reference object calculated on the basis of the second interference light incident on the spectroscope under the predetermined temperature environment, and the reference optical path length of the reference object acquired in advance, and corrects, on the basis of the fluctuation rate, the optical path length of the measurement target object calculated on the basis of the first interference light incident on the spectroscope under the predetermined temperature environment.

13 Claims, 20 Drawing Sheets

Fig.15
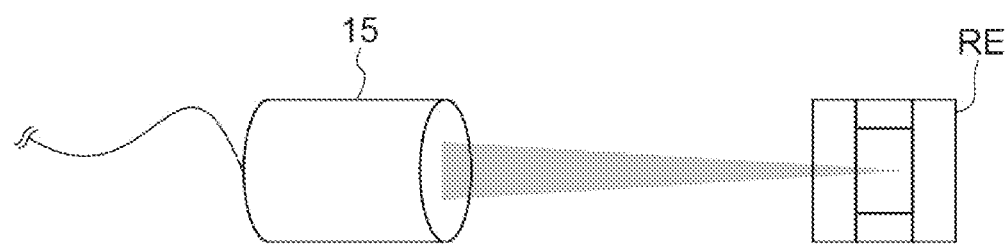
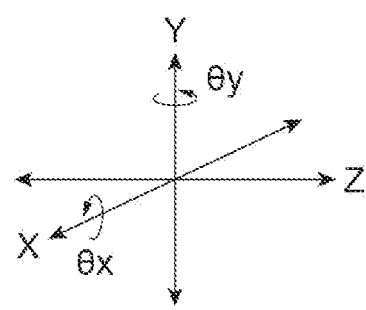

Fig. 19

| CONTENT OF PARTS | | EXAMPLE 1 | EXAMPLE 2 | EXAMPLE 3 | EXAMPLE 4 |
|---|---|---|---|---|---|
| SECOND OPTICAL UNIT (FOCUSER) | OPERATION DISTANCE | 47mm | 47mm | 47mm | 47mm |
| | SPOT DIAMETER | 50μm | 50μm | 50μm | 50μm |
| PARALLEL FLAT PLATE (UPPER PORTION) | MATERIAL | SYNTHETIC QUARTZ | SYNTHETIC QUARTZ | SYNTHETIC QUARTZ | SINGLE CRYSTAL SILICON |
| | UPPER SURFACE PROCESSING | ANTI-REFLECTION COATING | ANTI-REFLECTION COATING | ANTI-REFLECTION COATING | ANTI-REFLECTION COATING |
| | LOWER SURFACE PROCESSING | NON-PROCESSING | PARTIALLY REFLECTIVE COATING | PARTIALLY REFLECTIVE COATING | NON-PROCESSING |
| SPACER | MATERIAL | SYNTHETIC QUARTZ | SYNTHETIC QUARTZ | SYNTHETIC QUARTZ | SYNTHETIC QUARTZ |
| | THICKNESS | 2mm | 2mm | 2mm | 2mm |
| PARALLEL FLAT PLATE (LOWER PORTION) | MATERIAL | SYNTHETIC QUARTZ | SYNTHETIC QUARTZ | SYNTHETIC QUARTZ | SINGLE CRYSTAL SILICON |
| | UPPER SURFACE PROCESSING | NON-PROCESSING | REFLECTION COATING | PARTIALLY REFLECTIVE COATING | NON-PROCESSING |
| | LOWER SURFACE PROCESSING | ANTI-REFLECTION COATING | NON-PROCESSING | ANTI-REFLECTION COATING | ANTI-REFLECTION COATING |

Fig.20

| CONTENT OF EVALUATION | | EXAMPLE 1 | EXAMPLE 2 | EXAMPLE 3 | EXAMPLE 4 |
|---|---|---|---|---|---|
| WHEN ENVIRONMENT IS STABILIZED | SIGNAL INTENSITY (a.u.) | 65.28 | 474.25 | 435.30 | 436.06 |
| | OPTICAL PATH STABILITY(%) | 0.00085 | 0.00029 | 0.00037 | 0.00038 |
| TEMPERATURE OF REFERENCE OBJECT RE IS ADJUSTED | OPTICAL PATH LENGTH FLUCTUATION RATE (%) | 0.041 | 0.023 | 0.018 | 0.026 |
| TEMPERATURE OF REFERENCE OBJECT RE AND INTERFEROMETER IS ADJUSTED | OPTICAL PATH LENGTH FLUCTUATION RATE (%) | 0.894 | 0.653 | 0.419 | 0.503 |

SYSTEM AND METHOD FOR CORRECTING OPTICAL PATH LENGTH MEASUREMENT ERRORS

TECHNICAL FIELD

An exemplary embodiment of the present disclosure relates to a system and a method for correcting an optical path length measurement error.

BACKGROUND

Patent Document 1 discloses a system that appropriately measures a temperature of a measurement target object using optical interference. This system includes a light source, a spectroscope, a light transmission mechanism, an optical path length calculation unit, and a temperature calculation unit. The light source generates measurement light. The light transmission mechanism emits reflected light from a front surface and a back surface of the measurement target object to a spectroscope. The spectroscope measures an interference intensity distribution, which is an intensity distribution of the reflected light. The optical path length calculation unit performs a Fourier transform on the measured interference intensity distribution to calculate an optical path length. The temperature calculation unit calculates a temperature of the measurement target object on the basis of a relationship between the optical path length and the temperature.

PATENT DOCUMENT

[Patent Document 1] Japanese Unexamined Patent Application Publication No. 2013-29487

SUMMARY

The present disclosure provides a system and a method capable of correcting an optical path length measurement error caused by a spectroscope.

A system according to an aspect of the present disclosure includes a light source, a first optical unit, a second optical unit, a spectroscope, and a control unit. The light source generates light. The first optical unit emits the light to a measurement target object and receives first interference light incident from the measurement target object. The second optical unit emits the light to a reference object configured to have a constant optical path length with respect to a temperature fluctuation and receives second interference light incident from the reference object. The spectroscope is connected to the first optical unit and the second optical unit and configured to receive the first interference light and the second interference light to be incident. The control unit is connected to the spectroscope. The control unit calculates a fluctuation rate of a measurement optical path length with respect to a reference optical path length under a predetermined temperature environment on the basis of the optical path length of the reference object calculated on the basis of the second interference light incident on the spectroscope under the predetermined temperature environment, and the reference optical path length of the reference object acquired in advance. The control unit corrects, on the basis of the fluctuation rate, the optical path length of the measurement target object calculated on the basis of the first interference light incident on the spectroscope under the predetermined temperature environment.

According to the present disclosure, it is possible to correct an optical path length measurement error caused by a spectroscope.

BRIEF DESCRIPTION OF THE DRAWINGS

FIG. 15 is a diagram illustrating a positional relationship between the second optical unit and a reference object.

FIG. 19 is a table showing a configuration of reference objects according to examples.

FIG. 20 is a table showing evaluation results of the examples.

DETAILED DESCRIPTION

Figure 1:
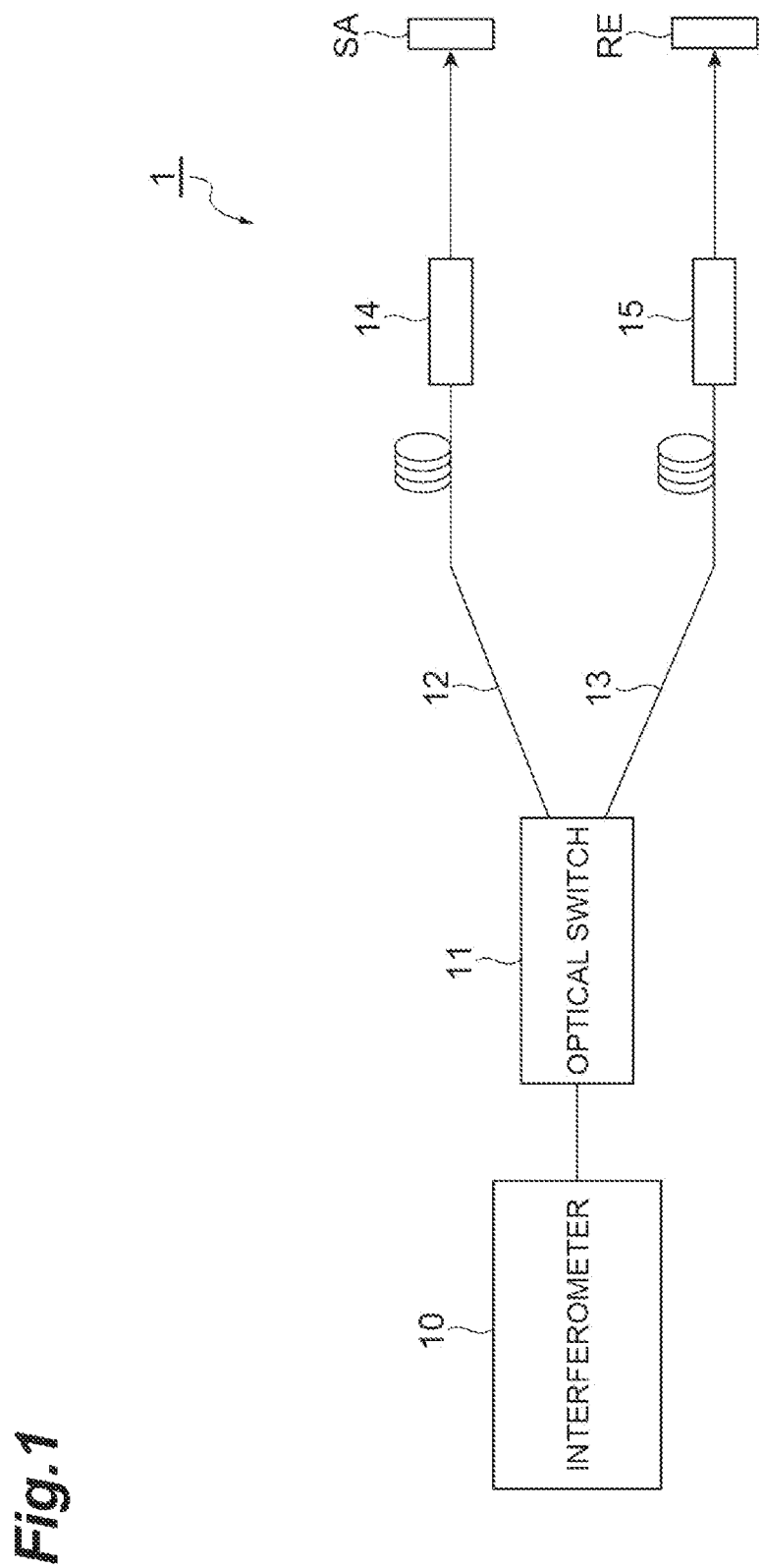
FIG. 1 is a diagram schematically illustrating an example of a system configuration according to an embodiment.

Hereinafter, various exemplary embodiments will be described.

In an interferometer of a type that acquires a reflection spectrum from a measurement target object using a spectroscope (hereinafter referred to as a spectroscopic interferometer), a temperature of the spectroscope mounted in the interferometer fluctuates due to an environmental temperature or heat generated inside the interferometer. The spectroscope includes a plurality of arranged light reception elements. When the temperature of the spectroscope fluctuates, there is concern that a spacing or disposition position of the plurality of light reception elements may fluctuate due to thermal expansion or contraction. In this case, the spectroscope cannot appropriately measure a wavelength, and an error may occur in a measurement optical path length. Therefore, the present disclosure provides a system and a method capable of correcting an optical path length measurement error caused by a spectroscope.

A system according to an aspect of the present disclosure includes a light source, a first optical unit, a second optical unit, a spectroscope, and a control unit. The light source generates light. The first optical unit emits the light to a measurement target object and receives first interference light incident from the measurement target object. The second optical unit emits the light to a reference object configured to have a constant optical path length with respect to a temperature fluctuation and receives second interference light incident from the reference object. The spectroscope is connected to the first optical unit and the second optical unit and configured to receive the first interference light and the second interference light to be incident. The control unit is connected to the spectroscope. The control unit calculates a fluctuation rate of a measurement optical path length with respect to a reference optical path length under a predetermined temperature environment on the basis of the optical path length of the reference object calculated on the basis of the second interference light incident on the spectroscope under the predetermined temperature environment, and the reference optical path length of the reference object acquired in advance. The control unit corrects, on the basis of the fluctuation rate, the optical path length of the measurement target object calculated on the basis of the first interference light incident on the spectroscope under the predetermined temperature environment.

In this system, the light is emitted to the measurement target object by the first optical unit, and the first interference light from the measurement target object is incident on the first optical unit. Light is emitted to the reference object configured to have a constant optical path length with respect to the temperature fluctuation by the second optical unit, and the second interference light from the reference object is incident on the second optical unit. The first interference light and the second interference light are incident on the spectroscope. The control unit calculates the fluctuation rate of the measurement optical path length with respect to the reference optical path length under a predetermined temperature environment on the basis of the measurement optical path length of the reference object calculated on the basis of the second interference light incident on the spectroscope under the predetermined temperature environment, and the reference optical path length of the reference object acquired in advance. The optical path length of the measurement target object calculated on the basis of the first interference light incident on the spectroscope under the predetermined temperature environment is corrected on the basis of the fluctuation rate. Because the optical path length of the reference object is constant with respect to the temperature fluctuation, it can be said that a measurement error caused by the temperature change of the spectroscope occurs when the optical path length calculated from measurement results of the spectroscope under a predetermined temperature environment fluctuates from the reference optical path length. The measurement error caused by the temperature change of the spectroscope can be expressed as the optical path length fluctuation rate of the reference object. Therefore, the system can correct the optical path length of the measurement target object on the basis of the optical path length fluctuation rate so that the measurement error caused by the temperature change of the spectroscope is canceled. Thus, this system can correct the optical path length measurement error caused by the temperature change of the spectroscope.

In an embodiment, the system may further include a circulator and an optical switch. The circulator is connected to the light source. The optical switch is connected to the circulator. The first optical unit may include a first optical fiber and a first optical element. The first optical fiber propagates light from the optical switch. The first optical element emits the light to the measurement target object and receives the first interference light incident from the measurement target object. In the embodiment, the first optical element may be a focuser or a collimator.

In an embodiment, the second optical unit may include a second optical fiber and a second optical element. The second optical fiber propagates the light from the optical switch. The second optical element emits the light to the reference object and receives the second interference light incident from the reference object. In the embodiment, the second optical element may be a focuser or a collimator. In this case, the system can switch a light emission direction using the optical switch to measure interference light from each of the measurement target object and the reference object.

In the embodiment, the reference object may be an etalon element. The second optical unit includes a third optical element and a fourth optical element. The third optical element emits light to the etalon element. The fourth optical element is configured to receive transmitted light incident from the etalon element. In the embodiment, the third optical element and the fourth optical element may be a focuser or a collimator. In this case, the system can calculate an optical path length fluctuation rate of the reference object on the basis of the interference light transmitted from the etalon element.

In the embodiment, the reference object may include a pair of opposing parallel flat plates. In the embodiment, the inside of the space between the parallel flat plates may be a vacuum.

A method according to another aspect of the present disclosure includes a step of emitting light to a measurement target object and causing first interference light from the measurement target object to be incident on a spectroscope under a predetermined temperature environment; a step of calculating an optical path length of the measurement target object on the basis of the first interference light; a step of emitting the light to a reference object configured to have a constant optical path length with respect to a temperature fluctuation, and causing second interference light from the reference object to be incident on the spectroscope under the predetermined temperature environment; a step of calculating a measurement optical path length of the reference object on the basis of the second interference light; a step of acquiring a reference optical path length of the reference object; a step of calculating a fluctuation rate of the measurement optical path length with respect to the reference optical path length under the predetermined temperature environment on the basis of the measurement optical path length of the reference object calculated on the basis of the second interference light and the reference optical path length of the reference object; and a step of correcting the optical path length of the measurement target object on the basis of the fluctuation rate. With this method, the optical path length measurement error caused by the temperature change of the spectroscope can be corrected, as in the system described above.

Hereinafter, various embodiments will be described in detail with reference to the drawings. In the following description and each drawing, the same or equivalent elements are denoted by the same reference signs, and duplicate description will not be repeated. Dimensional ratios in the drawings do not always match those described. The terms "top," "bottom," "left," and "right" are based on states shown and are for convenience.

Overview of System

FIG. 1 is a diagram schematically illustrating an example of a system configuration according to an embodiment. The system 1 illustrated in FIG. 1 is a system that measures an optical path length of a measurement target object SA using optical interference. The measurement target object SA is, for example, a member formed so that both a front surface and a back surface are parallel to each other. The measurement target object SA has transparency to light used in the system 1. The measurement target object SA is, for example, a polished single crystal silicon member. The measurement target object SA may be formed of at least one of Si (silicon), $SiO_2$ (quartz), and $Al_2O_3$ (sapphire) with respect to light of, for example, 1550 nm.

The system 1 includes an interferometer 10 and a first optical unit 14. The interferometer 10 generates measurement light. The interferometer 10 and the first optical unit 14 are connected by an optical fiber. Measurement light generated by the interferometer 10 is propagated to the first optical unit 14 by an optical fiber.

The first optical unit 14 is configured to emit light to the measurement target object SA. The first optical unit 14 is, for example, a collimator or a focuser. The first optical unit 14 emits light adjusted as a parallel light ray or convergent light focused on the measurement target object SA toward the front surface of the measurement target object SA. Reflected light (hereinafter also referred to as first interference light) from the measurement target object SA is incident on the first optical unit 14. The first interference light includes not only reflected light on the front surface but also reflected light on the back surface. The incident first interference light is propagated to the interferometer 10 via the optical fiber. As will be described below, the interferometer 10 calculates an optical path length of the measurement target object SA on the basis of the first interference light.

The system 1 has a configuration for measuring an optical path length of the reference object RE in order to cancel a temperature-dependent accuracy error of the interferometer 10. The reference object RE is configured so that the optical path length becomes constant with respect to a temperature fluctuation. That is, the reference object RE is configured so that the optical path length of the reference object RE does not substantially change even when an environmental temperature fluctuates. For example, the reference object RE is an object of which the temperature is strictly controlled. Alternatively, the reference object RE is an object having an optical path length that has no temperature dependence or has extremely small temperature dependence. A specific example of the reference object RE will be described below.

The system 1 includes a second optical unit 15 in order to measure the optical path length of the reference object RE. An optical switch 11 is provided between the interferometer 10 and the first optical unit 14. The optical switch 11 has a function of switching between propagation directions of light. The measurement light generated by the interferometer 10 is propagated to the optical switch 11 by an optical fiber, and is propagated to either the first optical unit 14 or the second optical unit 15 by using a function of the optical switch 11. The optical switch 11 and the first optical unit 14 are connected by a first optical fiber 12, and the optical switch 11 and the second optical unit 15 are connected by a second optical fiber 13. That is, the optical switch 11 is configured to be able to switch between a path of the first optical fiber 12 and a path of the second optical fiber 13.

The second optical unit 15 is configured to emit light to the reference object RE. The second optical unit 15 is, for example, a collimator or a focuser. The second optical unit 15 emits light adjusted as a parallel ray or convergent light focused on the reference object RE toward the front surface of the reference object RE. Reflected light from the reference object RE (hereinafter also referred to as second interference light) is incident on the second optical unit 15. The second interference light includes not only the reflected light on the front surface, but also reflected light on the back surface. The incident second interference light is propagated to the interferometer 10 via the second optical fiber 13 and the optical switch 11. As will be described below, the interferometer 10 calculates the optical path length of the reference object RE on the basis of the second interference light.

Details of Interferometer

Figure 2:
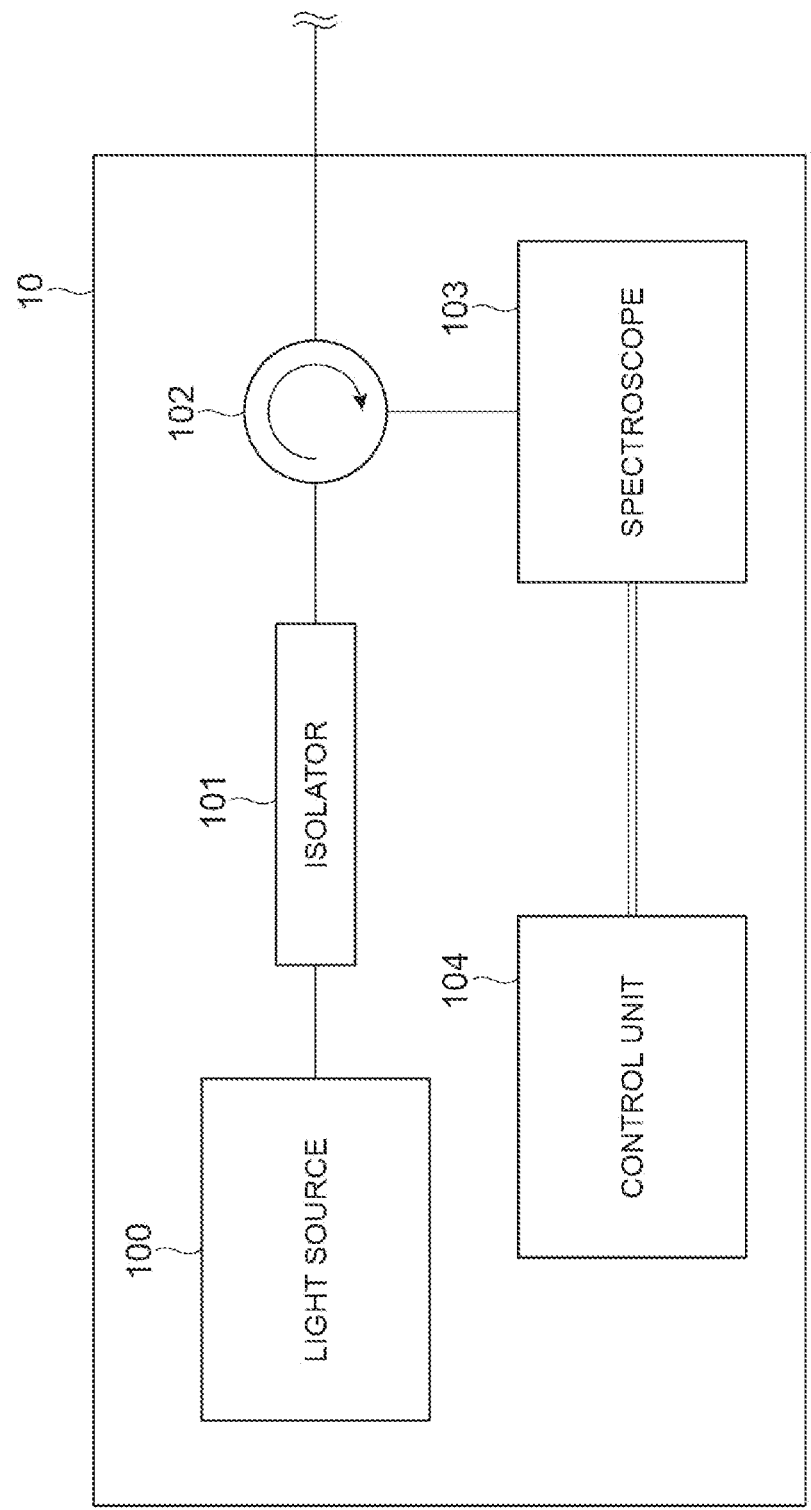
FIG. 2 is a diagram schematically illustrating an example of a configuration of an interferometer illustrated in FIG. 1.

FIG. 2 is a diagram schematically illustrating an example of a configuration of the interferometer illustrated in FIG. 1. The interferometer 10 includes a light source 100, an isolator 101, a circulator 102, a spectroscope 103, and a control unit 104. The light source 100, the isolator 101, the circulator 102, and the spectroscope 103 are connected by an optical fiber.

The light source 100 generates measurement light. A super luminescent diode (SLD) is used as an example of the light source 100.

The measurement light generated from the light source 100 propagates to the isolator 101 and the circulator 102 in that order, and propagates to the optical switch 11 illustrated in FIG. 1. As described above, the first interference light and the second interference light are acquired from the measurement target object SA and the reference object RE and propagated to the optical switch 11. The first interference light and the second interference light propagated from the optical switch 11 to the interferometer 10 are propagated from the circulator 102 to the spectroscope 103. The isolator 101 prevents the first interference light and the second interference light from returning to the light source 100. A coupler may be used instead of the circulator 102.

The spectroscope 103 is connected to the first optical unit 14 and the second optical unit 15 and is configured to receive the first interference light and the second interference light to be incident. The spectroscope 103 has, for example, a spectroscopic mechanism unit and a light reception unit. The spectroscopic mechanism disperses light at a predetermined dispersion angle for each wavelength. An example of the spectroscopic mechanism is a diffraction grating. The light reception unit acquires the light dispersed by the spectroscopic mechanism. An example of the light reception unit is a charge coupled device (CCD). The number of light reception elements is the number of samplings. Further, a wavelength span is defined on the basis of a dispersion angle of the spectroscopic mechanism and a distance between the spectroscopic mechanism and the photoelectric element. The first interference light and the second interference light are each dispersed for each wavelength in the spectroscope 103, and a light intensity is acquired for each wavelength. The spectroscope 103 converts the light intensity for each wavelength into digital data and outputs the digital data to the control unit 104.

The control unit 104 is connected to the spectroscope 103 and performs calculation on digital data related to the first interference light and the second interference light. The control unit 104 is physically configured as a computer system including a computing device such as a CPU, a main storage device such as a RAM and a ROM, an auxiliary storage device such as a hard disk, and a communication interface such as a network card. The control unit 104 performs calculation of the optical path length of the measurement target object SA, calculation of the optical path length of the reference object RE, generation of a parameter for canceling a measurement error of the spectroscope 103, and correction of the optical path length of the measurement target object SA. Details will be described below. The control unit 104 may be provided outside the interferometer 10.

Example of Reference Object

Figure 3:
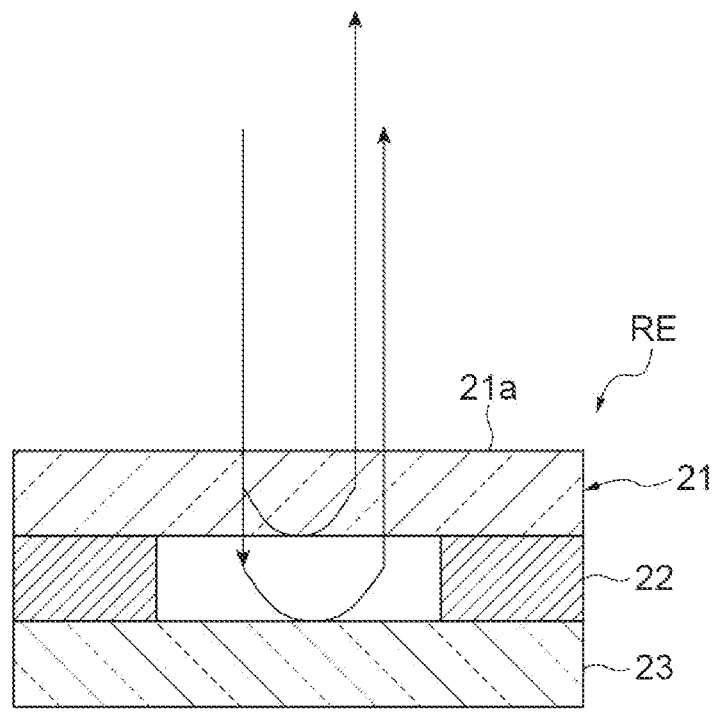
FIG. 3 is a diagram schematically illustrating an example of a cross section of a reference object.

FIG. 3 is a diagram schematically illustrating an example of a cross section of the reference object. The reference object RE illustrated in FIG. 3 is an object having an optical path length that has no temperature dependence or has extremely small temperature dependence. The reference object RE includes a pair of opposing parallel flat plates 21 and 23. The parallel flat plate 21 is formed of a material that transmits the light of the interferometer 10. The parallel flat plate 21 is formed of, for example, sapphire or quartz. A front surface and a back surface of the parallel flat plate 21 have an optically polished high-precision flat surface. An antireflection layer is formed on an upper surface 21a of the parallel flat plate 21. Accordingly, the light incident on the parallel flat plate 21 is reflected only on the back surface. In the parallel flat plate 23, a mirror-polished layer of a material that reflects the light of the interferometer 10 is formed on a front surface of the parallel flat plate 23. A material that reflects light is, for example, gold or aluminum. The parallel flat plate 23 is formed of; for example, sapphire or quartz. The front surface of the parallel flat plate 23 has an optically polished high-precision flat surface. The light incident on the parallel flat plate 23 is reflected only on the front surface. A spacer 22 is interposed between the pair of parallel flat plates 21 and 23. Accordingly, a space is defined between the pair of parallel flat plates 21 and 23. The spacer 22 is formed of a material having a small coefficient of linear expansion, such as quartz. The spacer 22 may be formed of a glass material having an extremely small coefficient of thermal expansion. Accordingly, because a distance between the parallel flat plates 21 and 23 does not change substantially depending on the temperature, temperature dependence of the optical path length becomes extremely small. The space between the parallel flat plates 21 and 23 may be a vacuum. In this case, the temperature dependence of the optical path length becomes smaller.

Figure 4:
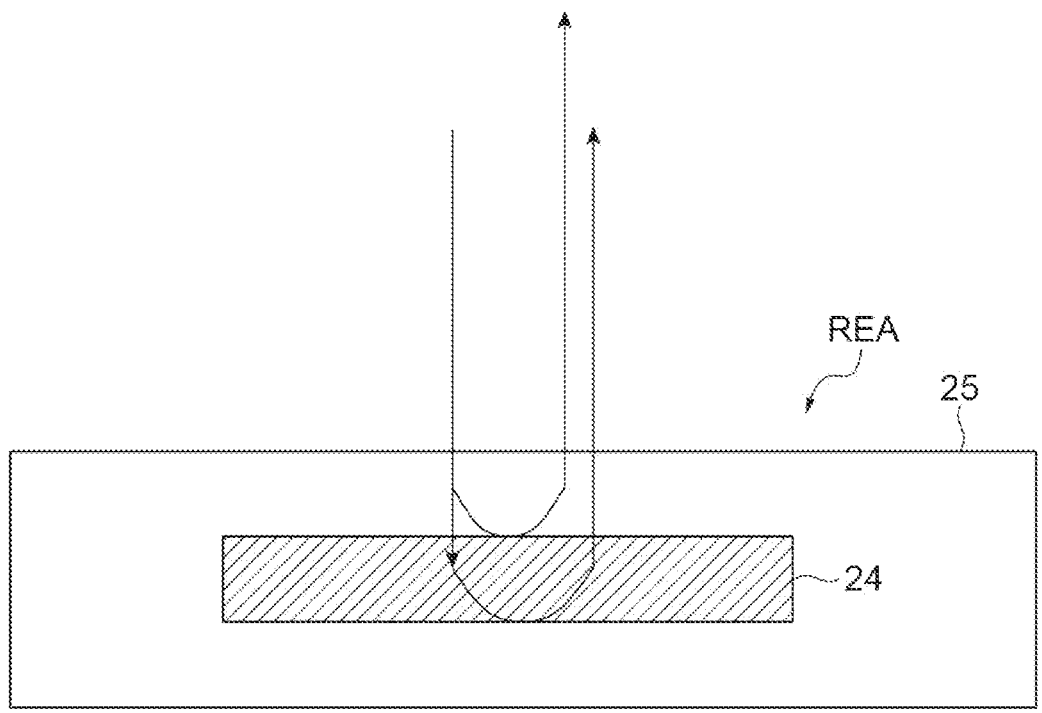
FIG. 4 is a diagram schematically illustrating another example of the reference object.

FIG. 4 is a diagram schematically illustrating another example of the reference object. A reference object REA illustrated in FIG. 4 is an object whose temperature is strictly managed. The reference object REA has a member 24 formed so that both a front surface and a back surface are parallel to each other. The member 24 is transparent to the light that is used in the system 1. The member 24 is, for example, a polished single crystal silicon member. The reference object RE may be formed of at least one of Si, $SiO_2$ and $Al_2O_3$ with respect to light of for example, 1550 nm. The member 24 is housed in a temperature cage 25. The temperature cage 25 has a function of maintaining a temperature at a predetermined temperature using a heater, a heat exchanger, or the like. A temperature of the member 24 is maintained at a predetermined temperature by the temperature cage 25.

Error of Spectroscope Due to Temperature

Figure 5:
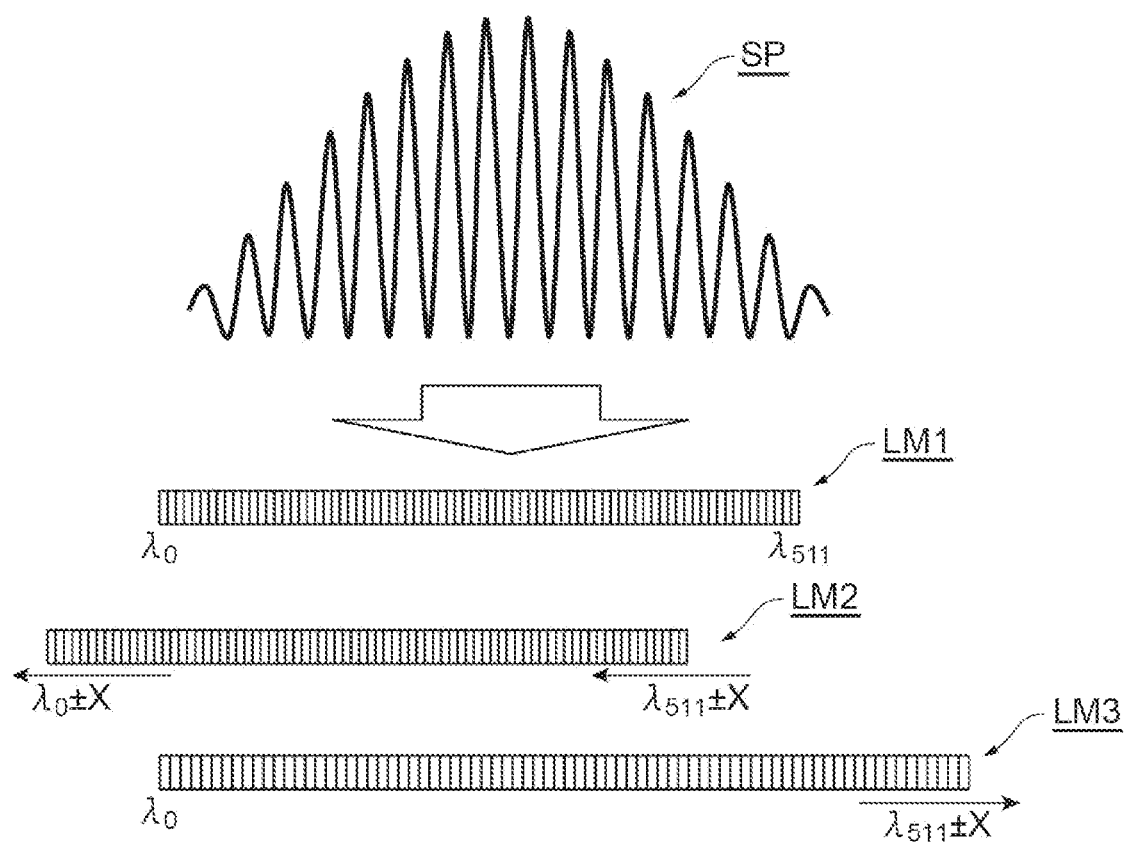
FIG. 5 is a diagram illustrating an error of a spectroscope.

FIG. 5 is a diagram illustrating an error of the spectroscope. The spectroscope 103 has an array of photoelectric elements. In the example illustrated in FIG. 5, a photoelectric element group LM1 includes photoelectric elements that receive light dispersed in wavelengths $\lambda_0$ to $\lambda_{511}$. When light SP is incident, the photoelectric element measures intensity for each wavelength of the light SP. A wavelength of a photoelectric element array of the spectroscope 103 is determined by a positional relationship among optical elements such as the spectroscopic mechanism, a mirror, and the photoelectric elements. Therefore, when the position of the optical element changes due to a temperature fluctuation, an error occurs in the wavelength of the spectroscope 103. For example, there are a case in which the entire photoelectric element array is shifted to the left and right (a photoelectric element group LM2), and a case in which the photoelectric element expands or contracts (a photoelectric element group LM3). When the measurement is performed by the spectroscope 103 in which the position of the optical element has changed, there is concern that an accurate optical path length of the measurement target object SA may not be obtained.

Principle of Correction of Optical Path Length

Figure 6:
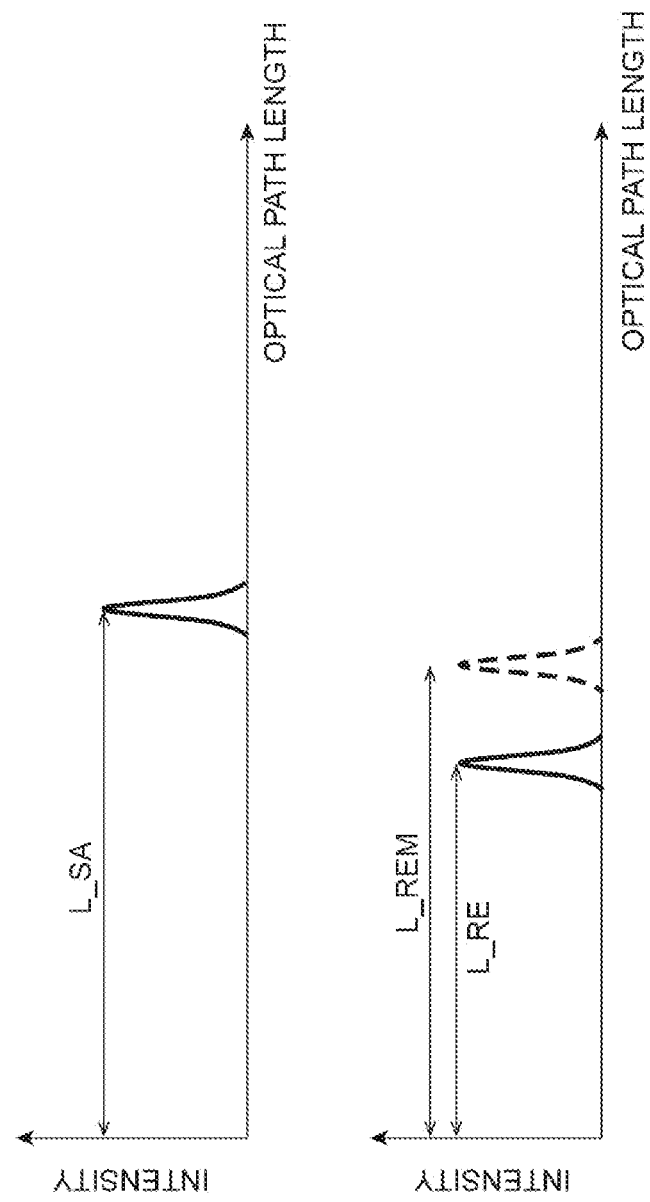
FIGS. 6A and 6B are diagrams illustrating a principle of optical path length correction.

The control unit 104 calculates the optical path length of the measurement target object SA. The control unit 104 performs Fourier transform, data interpolation, and calculation of a position of a centroid on an optical spectrum which is the digital data of the first interference light to calculate the optical path length of the measurement target object SA. FIGS. 6A and 6B are diagrams schematically illustrating the optical path length. A peak position of an optical spectrum illustrated in FIG. 6A indicates a measurement optical path length L_SA of the measurement target object SA. Similarly, the control unit 104 calculates the optical path length of the reference object RE. The control unit 104 performs Fourier transform, data interpolation, and calculation of a position of a centroid on an optical spectrum which is the digital data of the second interference light to calculate the optical path length of the reference object RE. A peak position of an optical spectrum illustrated in FIG. 6B indicates a measurement optical path length L_RE of the reference object RE. The measurement optical path length L_SA and the measurement optical path length L_RE are calculated on the basis of the interference light incident on the spectroscope 103 under a predetermined temperature environment. "Under a predetermined temperature environment" means that a temperature condition at the time of measurement is a predetermined condition. That is, the first interference light and the second interference light are measured by the spectroscope 103 under the same temperature conditions.

The optical path length of the reference object RE has no temperature dependence or has extremely small temperature dependence. Therefore, when a true value of the optical path length of the reference object RE (or the optical path length under a predetermined temperature environment) is set as a reference optical path length L_REM, the measurement optical path length L_RE and the reference optical path length L_REM match when the spectroscope 103 is accurate. However, when the measurement optical path length L_RE and the reference optical path length L_REM do not match, it is considered that a temperature-dependent error occurs in the spectroscope 103 under a predetermined temperature environment. The control unit 104 calculates a parameter for canceling a difference between the measurement optical path length L_RE and the reference optical path length L_REM. Specifically, the control unit 104 sets a value obtained by dividing the measurement optical path length L_RE by the reference optical path length L_REM as a fluctuation rate of the measurement optical path length L_RE with respect to the reference optical path length L_REM under a predetermined temperature environment. The control unit 104 corrects the measurement optical path length L_RE of the measurement target object SA on the basis of the fluctuation rate. The control unit 104 can correct the optical path length of the measurement target object SA, for example, by dividing the measurement optical path length L_RE of the measurement target object SA by the fluctuation rate.

Method of Correcting Optical Path Length

Figure 7:
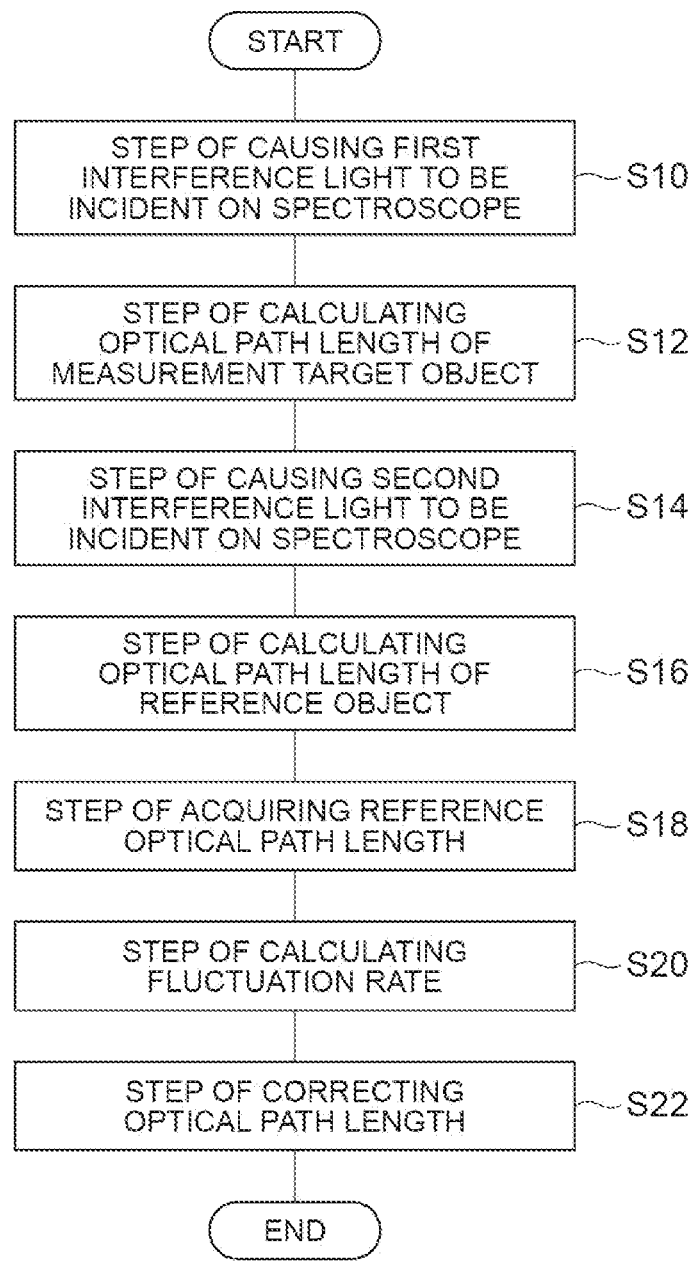
FIG. 7 is a flowchart illustrating a method of correcting an optical path length.

FIG. 7 is a flowchart illustrating a method of correcting the optical path length. The flowchart illustrated in FIG. 7 may be executed by system 1. First, the first optical unit 14 emits light to the measurement target object SA and causes the first interference light from the measurement target object SA to be incident on the spectroscope 103 under a predetermined temperature environment (step S10). Subsequently, the control unit 104 calculates the optical path length L_SA of the measurement target object SA on the basis of the first interference light (step S12 and FIG. 6A). Subsequently, the second optical unit 15 emits light to the reference object RE and causes the second interference light from the reference object RE to be incident on the spectroscope 103 under a predetermined temperature environment (step S14). Subsequently, the control unit 104 calculates the measurement optical path length L_RE of the reference object RE on the basis of the second interference light (step S16 and FIG. 6B).

Subsequently, the control unit 104 acquires the reference optical path length L_REM of the reference object RE (step S18 and FIG. 6B). The control unit 104 may read a true value of the reference optical path length of the reference object RE stored in a memory or the like, or may read the reference optical path length of the reference object RE measured at a predetermined timing and stored in the memory or the like.

Subsequently, the control unit 104 calculates the fluctuation rate of the measurement optical path length L_RE (step S20). The control unit 104 calculates the fluctuation rate of the measurement optical path length with respect to the reference optical path length under a predetermined temperature environment on the basis of the measurement optical path length L_RE of the reference object RE calculated on the basis of the second interference light, and the reference optical path length L_REM of the reference object RE. The control unit 104 uses the value obtained by dividing the measurement optical path length L_RE by the reference optical path length L_REM as the fluctuation rate of the measurement optical path length L_RE with respect to the reference optical path length L_REM under a predetermined temperature environment.

Finally, the control unit 104 corrects the optical path length L_SA of the measurement target object SA (step S22). The control unit 104 corrects the optical path length of the measurement target object SA by dividing the optical path length L_SA of the measurement target object SA by the fluctuation rate. Then, the flowchart showing the method of correcting the optical path length ends.

Conclusion of Embodiments

In the system 1 and the method of correcting an optical path length, the first optical unit 14 emits the light to the measurement target object SA, and receives the first interference light incident from the measurement target object SA. The second optical unit 15 emits light to the reference object RE configured to have a constant optical path length with respect to a temperature fluctuation, and receives the second interference light incident from the reference object RE. The first interference light and the second interference light are incident on the spectroscope 103. The control unit 104 calculates the fluctuation rate on the basis of the measurement optical path length L_RE of the reference object RE calculated on the basis of the second interference light incident on the spectroscope 103 under a predetermined temperature environment, and the reference optical path length L_REM of the reference object RE acquired in advance. The fluctuation rate is a fluctuation rate of the measurement optical path length L_RE with respect to the reference optical path length L_REM under a predetermined temperature environment. The optical path length L_SA of the measurement target object SA calculated on the basis of the first interference light incident on the spectroscope 103 under a predetermined temperature environment is corrected on the basis of the fluctuation rate. Because the optical path length of the reference object RE is constant with respect to a temperature fluctuation, when the optical path length calculated from a measurement result of the spectroscope 103 under a predetermined temperature environment fluctuates from the reference optical path length L_REM, it can be said that a measurement error due to a temperature change of the spectroscope 103 occurs. The measurement error caused by the temperature change of the spectroscope 103 can be expressed as the optical path length fluctuation rate of the reference object RE. Therefore, the system can correct the optical path length L_SA of the measurement target object SA on the basis of the optical path length fluctuation rate so that the measurement error caused by the temperature change of the spectroscope 103 is canceled. Thus, this system can correct the optical path length measurement error caused by the temperature change of the spectroscope 103.

Modification Examples

It will be appreciated that the embodiments of the present disclosure can be variously changed without departing from the scope and gist of the present disclosure. Accordingly, various embodiments disclosed in the present specification are not intended to be limiting, and a true scope and gist are set forth by the appended claims.

Modification Example of Second Optical Unit

Figure 8:
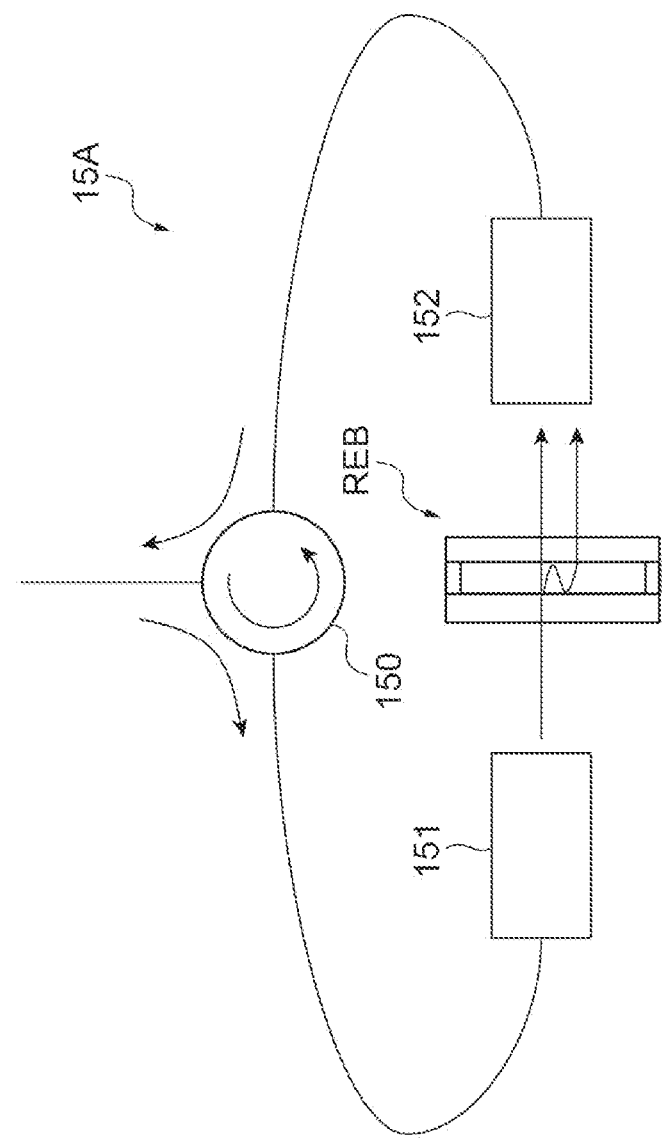
FIG. 8 is a diagram illustrating a modification example of a second optical unit.

FIG. 8 is a diagram illustrating a modification example of the second optical unit. As illustrated in FIG. 8, the second optical unit 15A differs from the second optical unit 15 in that transmitted light is acquired as the second interference light instead of the reflected light. The second optical unit 15A includes a circulator 150 and a pair of focusers or collimators 151 and 152. A reference object REB is disposed between the pair of focusers or collimators 151 and 152. The reference object REB includes an air gap therein and emits interference light according to a thickness of the air gap. As an example, the reference object REB is an etalon element.

Figure 9:
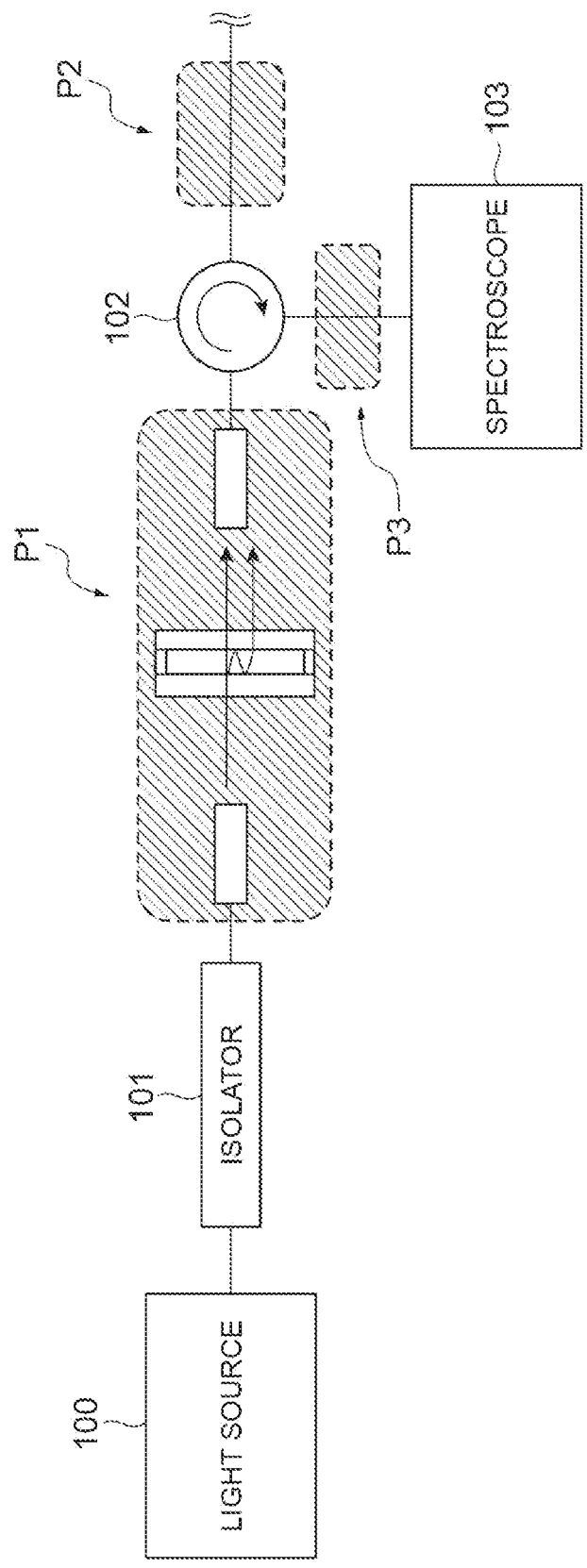
FIG. 9 is a diagram illustrating a disposition position of the second optical unit.

FIG. 9 is a diagram illustrating a disposition position of the second optical unit. As illustrated in FIG. 9, the second optical unit 15 may be provided at a position P1 between the isolator 101 and the circulator 102. In this case, the second optical unit 15 is built in the interferometer 10. Because the first interference light and the second interference light are acquired at the same time, the optical path length may be set so that FFT peak positions do not overlap. The second optical unit 15 may be provided at any one of a position P2 between the circulator 102 and the optical switch 11 and a position P3 between the circulator 102 and the spectroscope 103.

Simulation

Figure 10A:
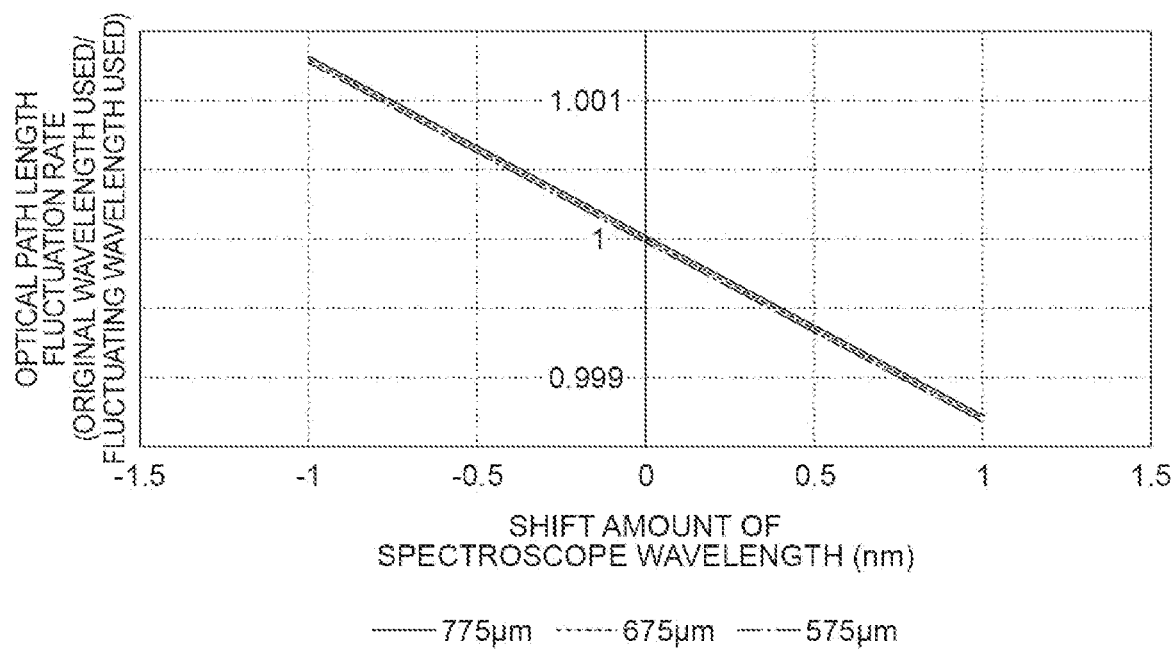
FIGS. 10A and 10B illustrate simulation results.
Figure 10B:
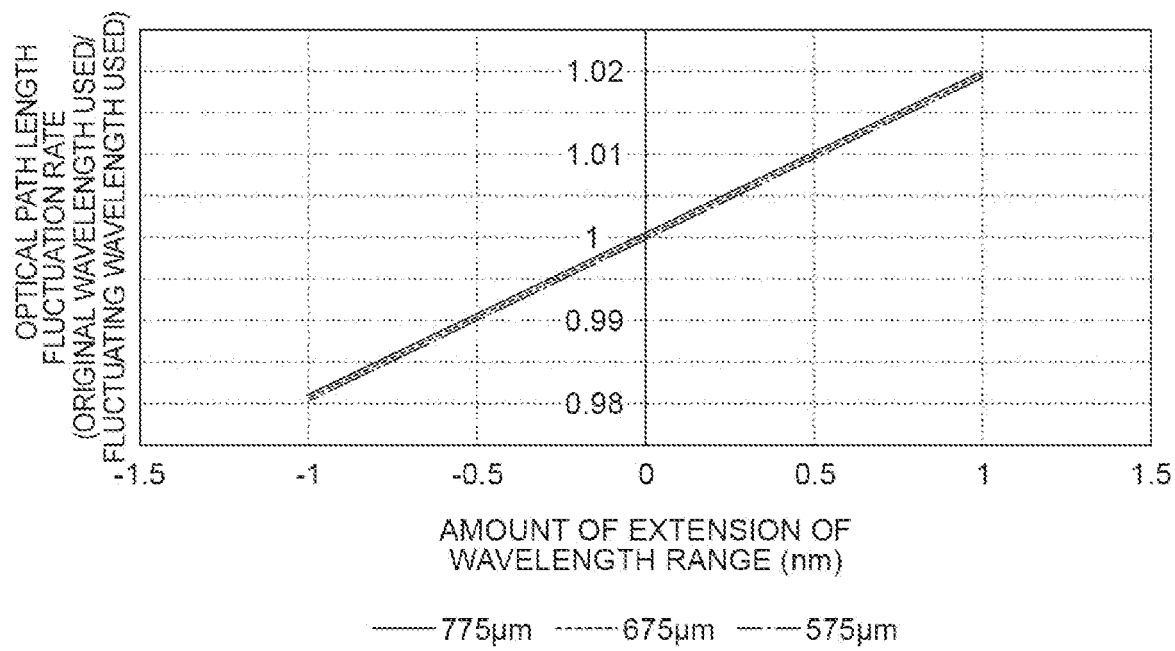

Hereinafter, a simulation was performed to verify the effects of the present disclosure. As illustrated in FIG. 5, there were 512 photoelectric elements, and it was assumed that a reflection spectrum from silicon, which is a measurement target object, was received. 1550 nm 25 nm was equally divided by the 512 elements to obtain $\lambda_0$ to $\lambda_{511}$. It was verified how the optical path length fluctuated when the photoelectric element moved using this wavelength as a reference. A wavelength when the element is totally shifted (LM2 in FIG. 5) and a wavelength when the element is expanded or contracted (LM3 in FIG. 5) were defined as fluctuating wavelengths ($\zeta'_0$ to $\lambda'_{511}$), and a reflectance at the respective fluctuating wavelengths was calculated. Three types of thicknesses of a silicon that is a measurement target were 775 μm, 675 μm, and 575 μm. FFT processing was performed on the basis of the calculated reflectance and the wavelength, and the optical path length was calculated. The optical path length calculated from the fluctuating wavelength was divided by the optical path length calculated using a reference wavelength, and this was used as a fluctuation rate of the optical path length. An amount of fluctuation of the wavelength and the fluctuation rate of the optical path length were plotted for each thickness. Results are illustrated in FIGS. 10A and 10B. FIGS. 10A and 10B show simulation results. FIG. 10A is a graph showing a relationship between a shift amount of the photoelectric element of the spectroscope and the fluctuation rate. FIG. 10B is a graph showing a relationship between an amount of expansion or contraction (an amount of extension of a wavelength range) of the photoelectric element of the spectroscope and a fluctuation rate. As illustrated in FIGS. 10A and 10B, the fluctuation rate of the optical path length due to the wavelength fluctuation of the spectroscope 103 was constant regardless of a thickness of the measurement target object. From this, it was confirmed that it is possible to perform effective correction on a plurality of measurement target objects having different optical path lengths by measuring one reference optical path length.

Effect Confirmation

Figure 11:
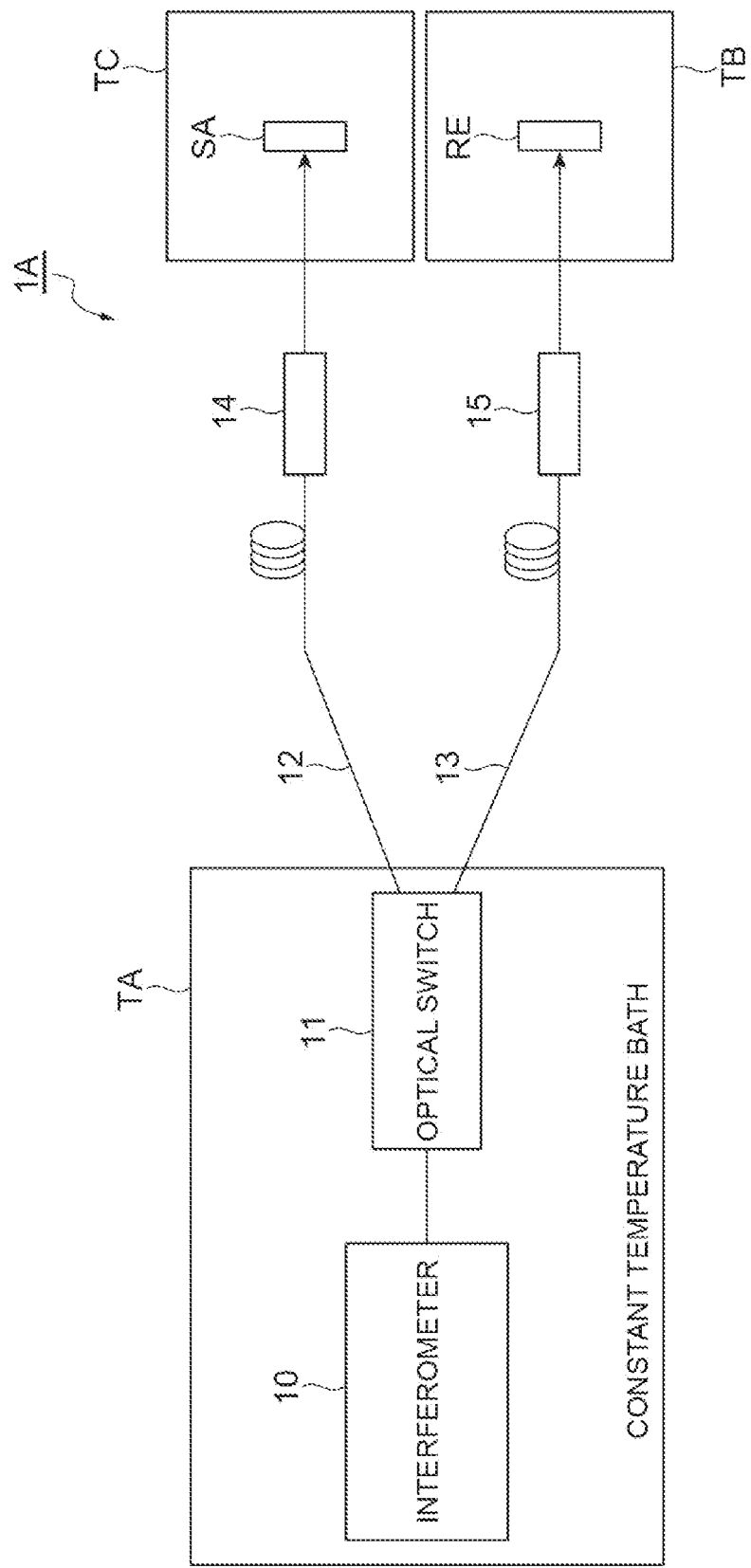
FIG. 11 is a diagram schematically illustrating an example of a configuration of a system according to an example.
Figure 12:
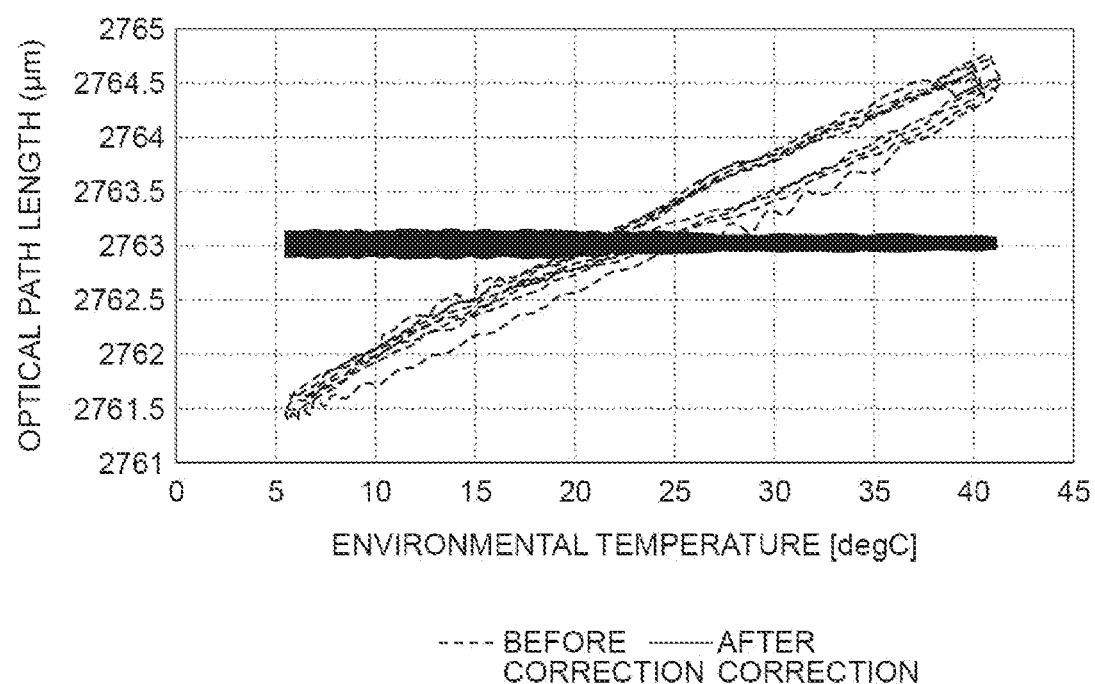
FIG. 12 is a graph showing an optical path length before and after correction.

FIG. 11 is a diagram schematically illustrating an example of the configuration of the system according to the embodiment. A system 1A illustrated in FIG. 11 differs from the system 1 of FIG. 1 in that the interferometer 10 and the optical switch 11 are disposed inside a constant temperature bath TA, the reference object RE is disposed in a temperature controller TB and the measurement target object SA is disposed in a temperature controller TC, and is the same as in others. That is, an environmental temperature of the interferometer 10 could be changed. The temperature range was set to 5° C. to 40° C. The measurement target object SA and the reference object RE were silicon substrates, and temperatures were controlled to be constant values. Because the temperature becomes a constant value, thermal expansion and an increase or decrease in the refractive index due to the temperature do not occur, and the optical path length becomes a constant value. Each optical path length when an environmental temperature has fluctuated in the constant temperature bath TA was measured, and the optical path length of the measurement target object SA was evaluated in a case in which the optical path length has been corrected by the fluctuation rate of the reference optical path length and a case in which the optical path length has not been corrected by the fluctuation rate of the reference optical path length. The optical path length of the reference object RE was standardized with the optical path length at a point in time of measurement start as 1, and was used as the fluctuation rate of the reference optical path length. The optical path length of the measurement target object SA measured at the same timing was divided by the reference optical path length fluctuation rate so that a corrected optical path length is obtained. Results are illustrated in FIG. 12. In FIG. 12, a horizontal axis indicates an environmental temperature and a vertical axis indicates the optical path length. It was confirmed that, in the environmental temperature range of 5° C. to 40° C., a fluctuation range of the optical path length before correction was 3.3 μm, whereas a fluctuation range of the optical path length after correction was improved to 0.24 μm, as illustrated in FIG. 12.

Holder

Figure 13:
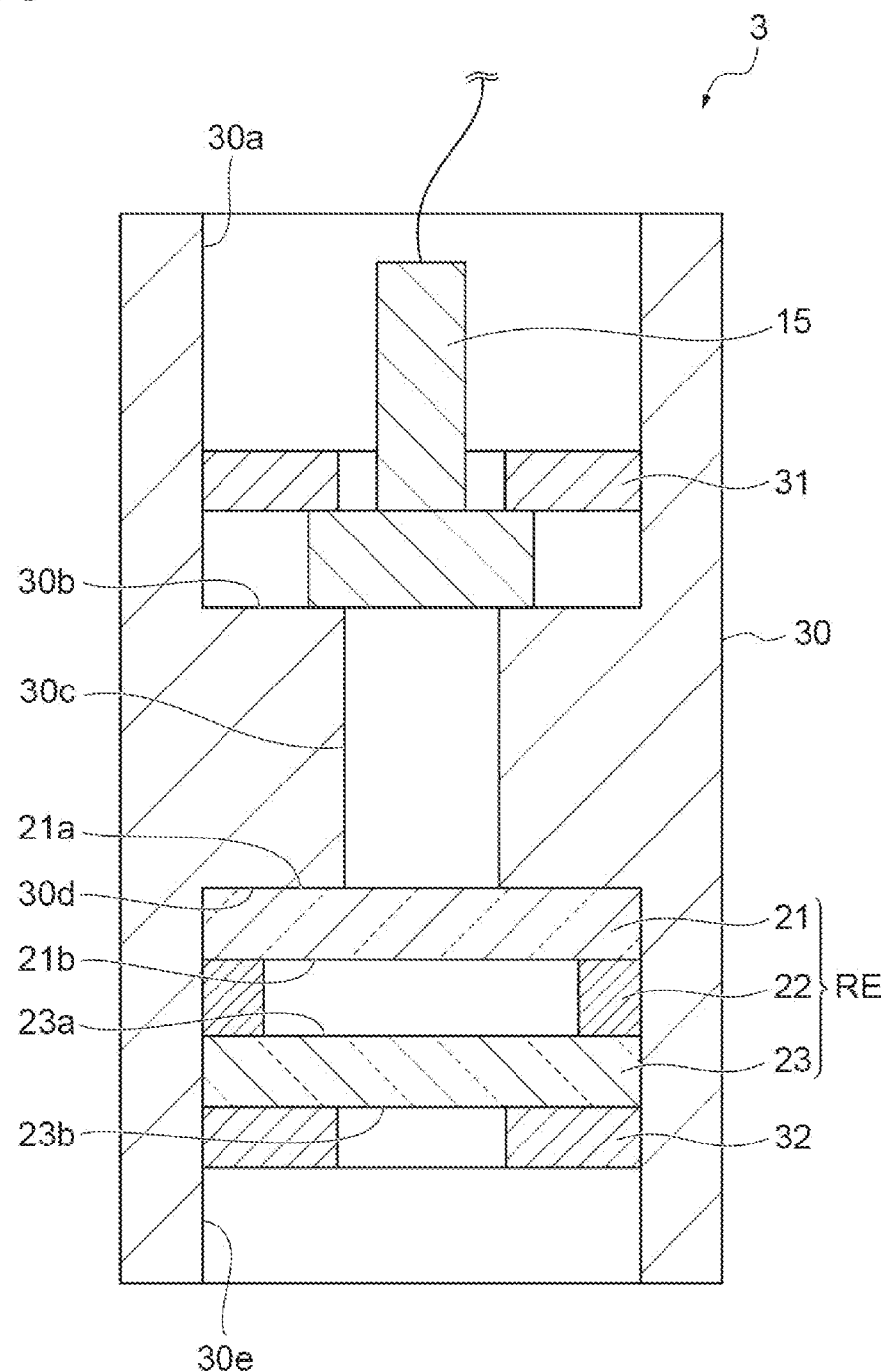
FIG. 13 is a diagram schematically illustrating an example of a cross section of a holder.

The system 1 may include a holder that holds a relative position between the second optical unit 15 and the reference object RE. FIG. 13 is a diagram schematically illustrating an example of a cross section of the holder. As illustrated in FIG. 13, a holder 3 fixes the second optical unit 15 and the reference object RE. The holder 3 includes a housing 30. The housing 30 is a cylindrical body, and is, for example, a cylinder. The housing 30 may be configured of a member having a small coefficient of linear expansion. The housing 30 is formed of for example, synthetic quartz. The housing 30 has an internal optical path 30c having a reduced diameter in a central portion of the housing 30 in a vertical direction.

An upper surface of the housing 30 is open. The second optical unit 15 is housed inside the housing 30 from an opening of the upper surface of the housing 30, and is disposed to emit light to the internal optical path 30c and receive light from the internal optical path 30c. The lower surface of the second optical unit 15 is abutted against a first stepped surface 30b on which an upper end of the internal optical path 30c is formed. The abutted second optical unit 15 is sandwiched between a first holding member 31 and the first stepped surface 30b. The first holding member 31 is attached to the housing 30. For example, a screw groove formed on the inner surface 30a of the housing 30 and a screw to be screwed are formed on a side surface of the first holding member 31. The screw formed on the inner surface 30a of the housing 30 and the screw groove to be screwed may be formed on the side surface of the first holding member 31. The second optical unit 15 is fixed to the inside of the housing 30 by being screwed to the inner surface of the housing 30 in a state in which the second optical unit 15 is sandwiched between the first holding member 31 and the first stepped surface 30b.

A lower surface of the housing 30 is open. The reference object RE is housed inside the housing 30 from an opening of the lower surface of the housing 30, and is disposed to be able to receive light from the internal optical path 30c and reflect light to the internal optical path 30c. The upper surface 21a of the reference object RE is abutted against a second stepped surface 30d on which a lower end of the internal optical path 30c is formed. The abutted reference object RE is sandwiched between a second holding member 32 and the second stepped surface 30d. The second holding member 32 is attached to the housing 30. For example, a screw groove formed on an inner surface 30e of the housing 30 and a screw to be screwed are formed on a side surface of the second holding member 32. A screw formed on the inner surface 30e of the housing 30 and a screw groove to be screwed may be formed on the side surface of the second holding member 32. The reference object RE is fixed to the inside of the housing 30 by the second holding member 32 being screwed to the inner surface of the housing 30 in a state in which the reference object RE is sandwiched between the second holding member 32 and the second stepped surface 30d.

In the holder 3, the housing 30 functions as a spacer that holds the relative position between the second optical unit 15 and the reference object RE. Accordingly, a fluctuation of an incidence angle of the light and a fluctuation of a measurement position are curbed, and, as a result, a decrease in signal intensity is curbed. Therefore, the system 1 including the holder 3 can correct the optical path length measurement error more accurately.

Because the housing 30 of the holder 3 is configured of the member having a small coefficient of linear expansion, it is possible to reduce an influence of an external temperature change (environmental temperature change) on the relative position between the second optical unit 15 and the reference object RE. Further, because parts constituting the holder 3 are mechanically connected, it is possible to reduce an influence of an external temperature change on the relative position between the second optical unit 15 and the reference object RE, as compared with a case in which the parts are fixed with an adhesive or the like.

Modification Example of Holder

Figure 14:
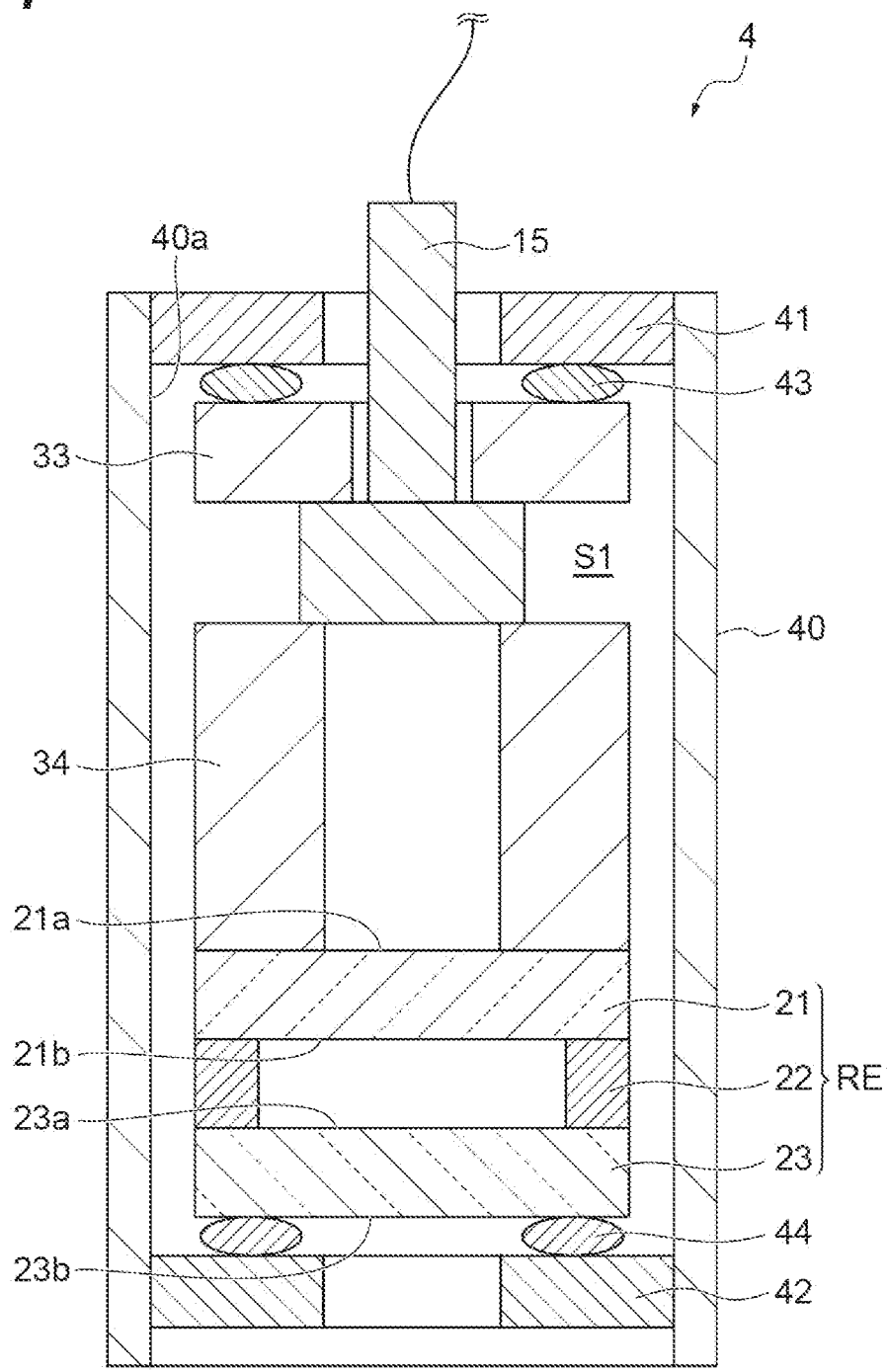
FIG. 14 is a diagram schematically illustrating an example of a cross section of another holder.

In the holder 3, the housing 30 functions as the spacer that holds the relative position between the second optical unit 15 and the reference object RE, but the housing and the spacer may be separate bodies. FIG. 14 is a diagram schematically illustrating an example of a cross section of another holder. As illustrated in FIG. 14, the holder 4 fixes the second optical unit 15 and the reference object RE. The holder 4 includes a housing 40. The housing 40 is a cylindrical body, and is, for example, a cylinder. The housing 40 does not function as a spacer for holding the relative position between the second optical unit 15 and the reference object RE, unlike the housing 30 illustrated in FIG. 13. Therefore, the housing 40 does not need to be configured of a member having a small coefficient of linear expansion, and is formed of for example, aluminum or stainless steel.

The second optical unit 15 and the reference object RE are housed inside the housing 40, similar to the holder 3 illustrated in FIG. 13. A first spacer member 34 is disposed between the second optical unit 15 and the reference object RE. The first spacer member 34 may be configured of a member having a small coefficient of linear expansion. The first spacer member 34 is formed of for example, synthetic quartz.

The second optical unit 15 and the reference object RE are sandwiched and fixed between the first holding member 41 and the second holding member 42. That is, the second optical unit 15 and the reference object RE are sandwiched between the first holding member 41 and the second holding member 42 in a state in which relative positions are held by the first spacer member 34. A screw formed on an outer periphery of the first holding member 41 and the second holding member 42 and a screw groove to be screwed are formed on the inner surface of the housing 40. A screw groove formed on the outer periphery of the first holding member 41 and the second holding member 42 and a screw groove to be screwed may be formed on the inner surface of the housing 40. Thus, the first holding member 41 and the second holding member 42 are screwed to the housing 40 and sandwiched in a vertical direction so that the second optical unit 15 and the reference object RE are fixed.

A second spacer member 33 is provided between the first holding member 41 and the second optical unit 15 so that the second optical unit 15 and the reference object RE are stably sandwiched. The second spacer member 33 may be configured of a member having a small coefficient of linear expansion. The second spacer member 33 may be configured of a member having a low thermal conductivity. The second spacer member 33 is formed of for example, synthetic quartz.

An elastic member 43 is provided between the first holding member 41 and the second spacer member 33. Similarly, an elastic member 44 is provided between the second holding member 42 and the reference object RE. The elastic members 43 and 44 are annular members and are formed of resin as an example. Accordingly, the relative position between the second optical unit 15 and the reference object RE is held even when the housing 40 is thermally expanded or contracted due to an external temperature fluctuation. Further, the elastic members 43 and 44 form an air layer between the housing 40 and components such as the second optical unit 15 and the reference object RE. Therefore, the holder 4 has a structure in which heat is not easily transferred from the housing 40 to internal components.

The holder 4 may include at least one of the elastic members 43 and 44. Even with such a configuration, when the housing 40 is thermally expanded/contracted, the holder 4 can hold a relative position between the second optical unit 15 and the reference object RE. The holder 4 may include a third spacer member between the second holding member 42 and the reference object RE. The third spacer member is formed of for example, synthetic quartz. Because the holder 4 includes the third spacer member, a structure is such that heat is not easily transferred from the housing 40 to the reference object RE.

The holders 3 and 4 may be housed in a heat insulating structure in order to curb an external temperature change. The holders 3 and 4 may hold the reference object REA instead of the reference object RE. Alternatively, the holders 3 and 4 may hold the reference object REB.

Modification Example of Reference Object

The reference object may include a reflective film on at least one of the facing inner surfaces of the parallel flat plates in order to increase a reflection intensity. For example, the reference object RE illustrated in FIGS. 13 and 14 includes a pair of parallel flat plates 21 and 23. A reflective film is formed on facing inner surfaces 21b and 23a of the parallel flat plates 21 and 23. The reflective film may be a reflective film that partially reflects light (a film that transmits a predetermined rate of light and reflects remaining light). The reflective film may be a multilayer dielectric film as an example. The reflective film 23a may be a mirror film that totally reflects light.

The parallel flat plates 21 and 23 may be formed of single crystal silicon. When the parallel flat plates 21 and 23 are formed of single crystal silicon, the reflection intensity from the reference object increases. Therefore, the reference object may not include a reflective film.

Positional Relationship Between Second Optical Unit and Reference Object

When the positional relationship between the second optical unit and the reference object deviated, an influence of the deviation on the optical path length and the signal intensity was confirmed. FIG. 15 is a diagram illustrating the positional relationship between the second optical unit and the reference object. As illustrated in FIG. 15, light was emitted from the second optical unit 15 to the reference object RE, and return light was acquired. In this case, the measurement was performed with a measurement position and posture of the second optical unit 15 being changed. In a measurement coordinate system, positions in a horizontal direction of the second optical unit 15 were in X and Y directions (a front is an origin 0), a focal length of the second optical unit 15 was in a Z direction, and an optical axis rotation direction of the second optical unit was $\Theta x, \Theta y$.

Figure 16:
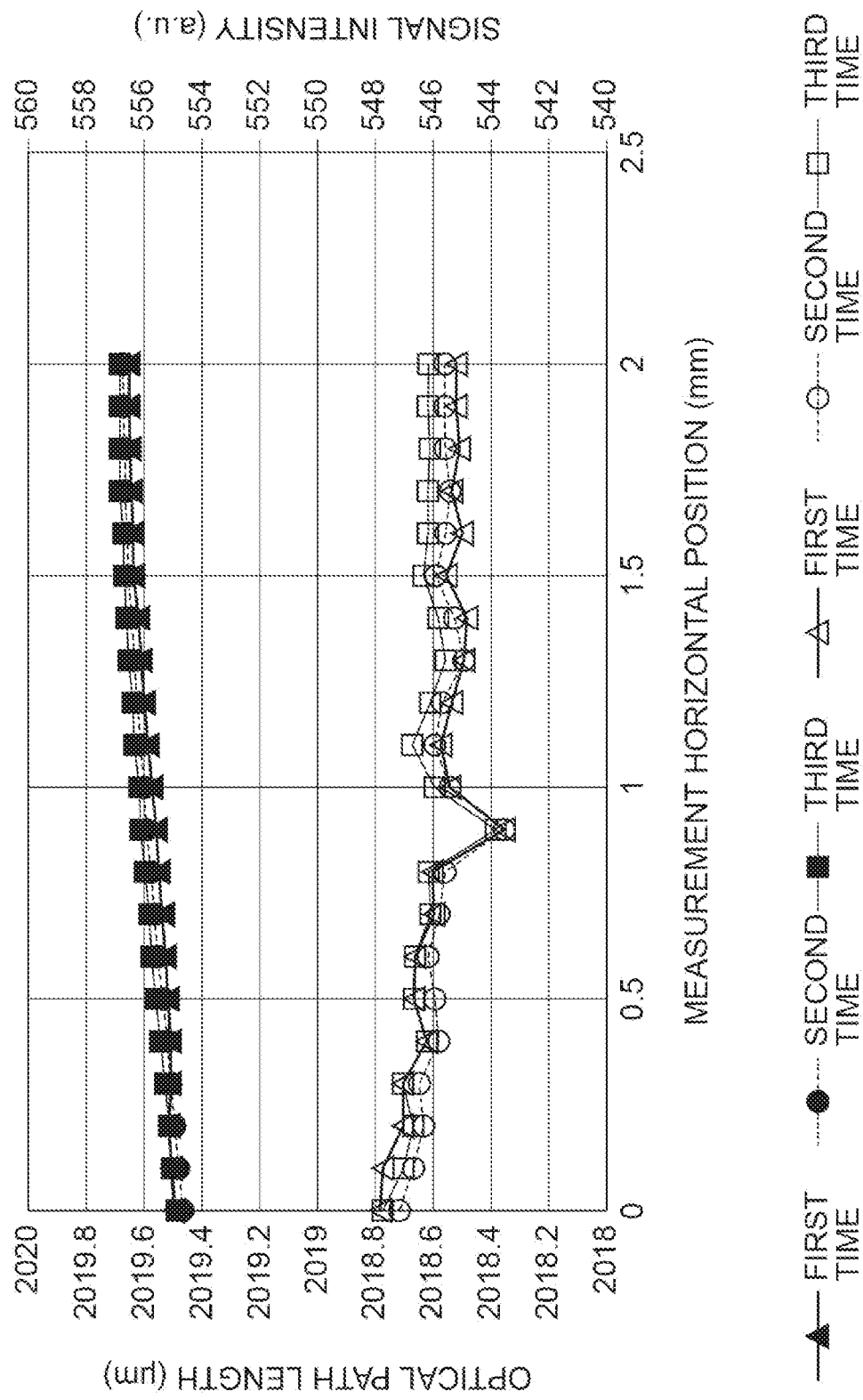
FIG. 16 is a graph showing an optical path length and signal intensity measured for each relative horizontal position between the second optical unit and the reference object.

FIG. 16 is a graph showing an optical path length and signal intensity measured for each relative horizontal position between the second optical unit and the reference object. A horizontal axis indicates a measurement horizontal position, a left vertical axis indicates the optical path length, and a right vertical axis indicates the signal intensity. The optical path length is plotted by black-painted data points, and the signal intensity is plotted by white-painted data points. It was confirmed that, when a position in a horizontal direction of the second optical unit 15 deviates by about 2 mm, an error in the optical path length of about 0.2 μm occurred. It was also confirmed that the signal intensity also varied slightly depending on the position in the horizontal direction of the second optical unit 15.

Figure 17:
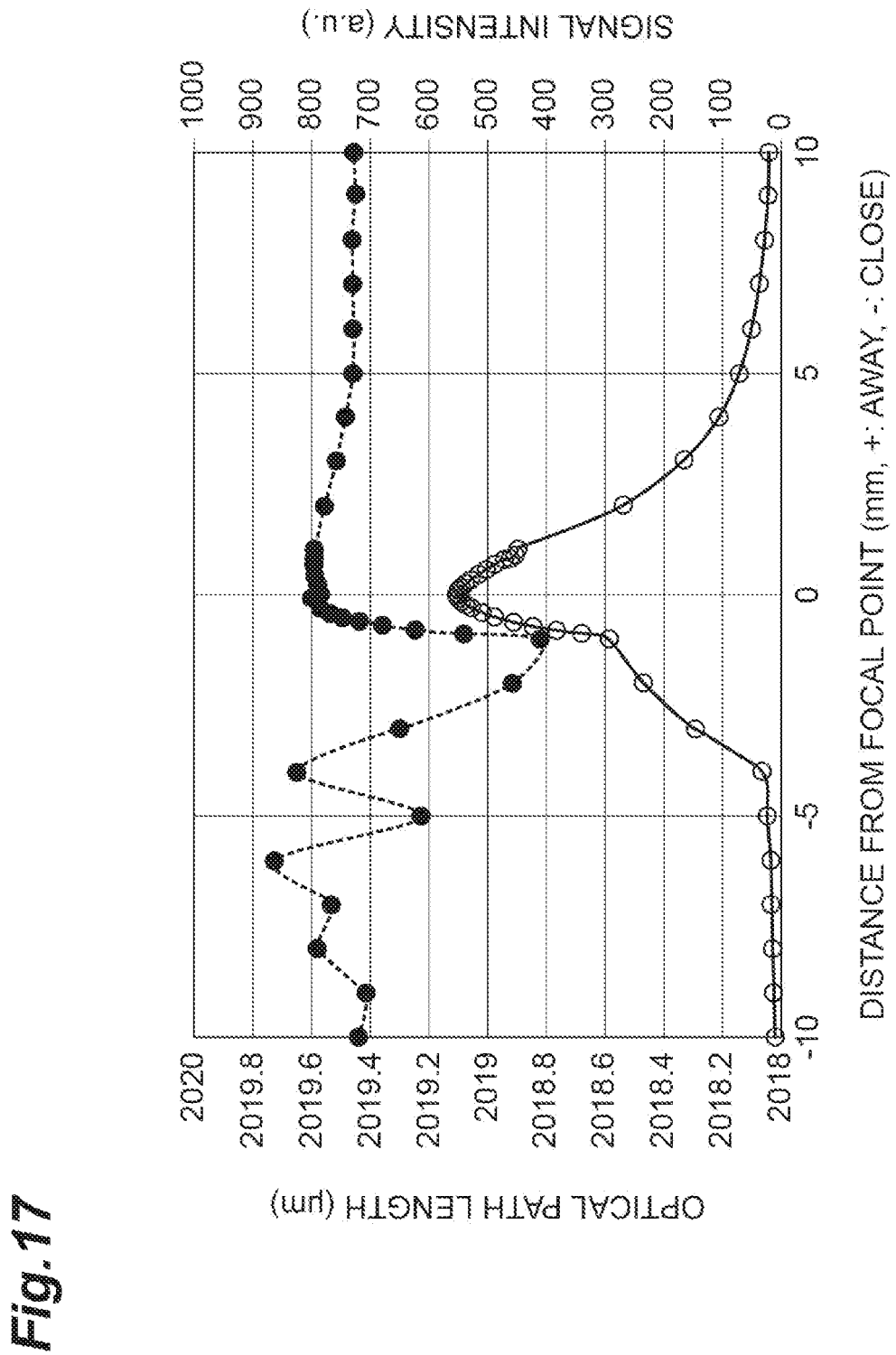
FIG. 17 is a graph showing an optical path length and signal intensity measured for each focal length of the second optical unit.

FIG. 17 is a graph showing an optical path length and signal intensity measured for each focal length of the second optical unit. A horizontal axis indicates a distance from a focal point, a positive distance indicates a case in which the second optical unit and the reference object are separated from each other with respect to a point at which the focal point is in focus and the signal intensity is maximized, and a negative distance indicates a case in which the second optical unit and the reference object are close to each other. A left vertical axis indicates the optical path length, and a right vertical axis indicates the signal intensity. The optical path length is plotted by black-painted data points, and the signal intensity is plotted by white-painted data points. It was confirmed that, when the position of the second optical unit 15 from the focal point deviates from a reference position, the optical path length and the signal intensity greatly varied depending on the position of the second optical unit 15 from the focal point.

Figure 18:
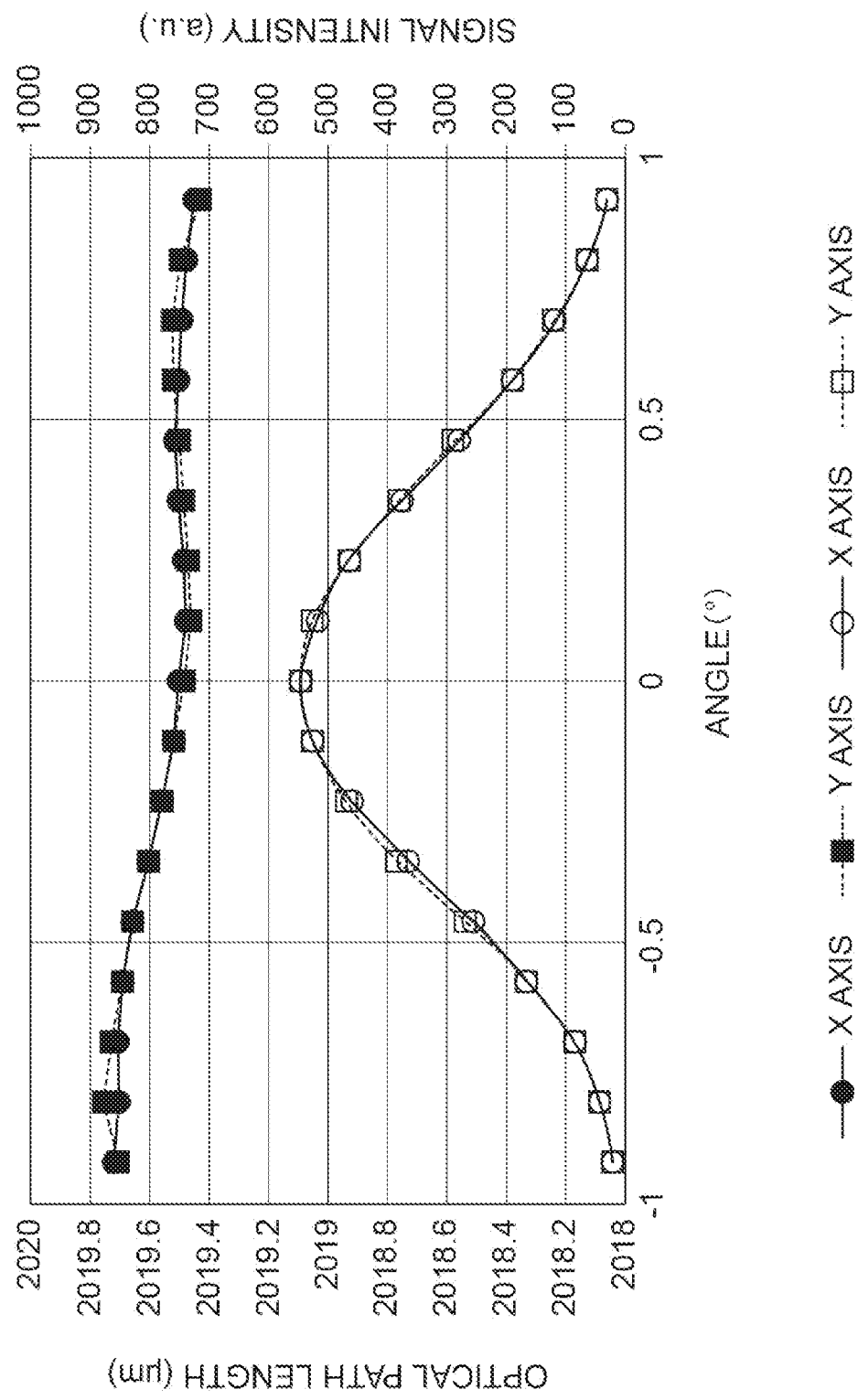
FIG. 18 is a graph showing an optical path length and signal intensity measured for each angle around an optical axis of the second optical unit.

FIG. 18 is a graph showing an optical path length and signal intensity measured for each angle around an optical axis of the second optical unit. A horizontal axis indicates an angle around an optical axis, a left vertical axis indicates the optical path length, and a right vertical axis indicates the signal intensity. The optical path length is plotted by black-painted data points, and the signal intensity is plotted are white-painted data points. It was confirmed that, when an angle of rotation of the second optical unit 15 deviates by about 2 degrees, an error of the optical path length of about 0.4 μm occurred. It was also confirmed that the signal intensity also changed depending on the angle of the rotation of the second optical unit 15.

From results illustrated in FIGS. 16 to 18, it was confirmed that the error of the optical path length become larger when the focal length deviates as compared with deviation of the position in the horizontal direction and deviation of the angle of the second optical unit 15. Accordingly, it was confirmed that, when the relative position between the second optical unit 15 and the reference object RE was maintained, a configuration that does not cause a position deviation in a Z direction is particularly effective for an error of the optical path length. That is, it was confirmed that the holders illustrated in FIGS. 13 and 14 are effective for the error of the optical path length because a relative position is fixed in a structure sandwiched in a vertical direction.

Evaluation of Reference Object

Four reference objects were prepared and effects of the reflective film were evaluated. FIG. 19 is a table showing a configuration of the reference object according to examples. As illustrated in FIG. 19, in Example 1, an inner surface 21b (lower surface) of the upper parallel flat plate 21 and an inner surface 23a (upper surface) of the lower parallel flat plate 23 do not have a reflective film. In Examples 2 and 3, a reflective film is formed on the facing inner surfaces 21b and 23a by applying reflective coating or partially reflective coating. In example 4, a parallel flat plate is formed of single crystal silicon, and there is no reflective film on the facing inner surfaces 21b and 23a.

A signal intensity was measured in a state in which an external temperature change was stabilized with respect to Examples 1 to 4. Further, measurement was performed a plurality of times and stability of the optical path length was evaluated by 6a. Further, when the temperature of the reference object RE was caused to fluctuate in a temperature range of 5 to 40° C. and when the temperatures of the reference object RE and the interferometer were caused to fluctuate in the temperature range of 5 to 40° C., the optical path length fluctuation rate was also measured. Results are illustrated in FIG. 20.

FIG. 20 is a table showing evaluation results of the examples. As illustrated in FIG. 20, in Examples 2 and 3 with a reflective film and Example 4 with a parallel flat plate formed of single crystal silicon, it was confirmed that signal intensity and optical path stability were significantly improved, as compared with Example 1 without a reflective film. Further, in Examples 2 to 4, it was confirmed that a fluctuation rate of the optical path length was smaller as compared with that in Example 1 even when the temperature fluctuates. Therefore, it was suggested that the optical path length measurement error can be corrected accurately by using the reference object including a reflective film on at least one of the facing inner surfaces of the parallel flat plates.

REFERENCE SIGNS LIST 1, 1A . . . System; 3, 4 . . . Holder; 11 . . . Optical switch; 12 . . . First optical fiber; 13 . . . Second optical fiber; 14 . . . First optical unit; 15, 15A . . . Second optical unit; 21, 23 . . . Parallel plate; 100 . . . Light source; 102, 150 . . . Circulator; 103 . . . Spectroscope; 104 . . . Control unit; 151, 152 . . . Focuser or collimator; RE, REA, REB . . . Reference object; SA . . . Measurement target object.

What is claimed is:

1. A system for correcting an optical path length measurement error, the system comprising:
    a light source configured to generate light;
    a first optical unit configured to emit the light to a measurement target object and receive first interference light incident from the measurement target object;
    a second optical unit configured to emit the light to a reference object configured to have a constant optical path length with respect to a temperature fluctuation and receive second interference light incident from the reference object;
    a spectroscope connected to the first optical unit and the second optical unit and configured to receive the first interference light and the second interference light to be incident; and
    a control unit connected to the spectroscope,
    wherein the control unit
    calculates a fluctuation rate of a measurement optical path length with respect to a reference optical path length under a predetermined temperature environment on the basis of the optical path length of the reference object calculated on the basis of the second interference light incident on the spectroscope under the predetermined temperature environment, and the reference optical path length of the reference object acquired in advance, and
    corrects, on the basis of the fluctuation rate, the optical path length of the measurement target object calculated on the basis of the first interference light incident on the spectroscope under the predetermined temperature environment.

2. The system for correcting an optical path length measurement error according to claim 1, further comprising:
    a circulator connected to the light source; and
    an optical switch connected to the circulator,
    wherein the first optical unit includes
    a first optical fiber configured to propagate light from the optical switch; and
    a first optical element configured to emit the light to the measurement target object and receive the first interference light incident from the measurement target object.

3. The system for correcting an optical path length measurement error according to claim 2, wherein the first optical element is a focuser or a collimator.

4. The system for correcting an optical path length measurement error according to claim 2,
    wherein the second optical unit includes
    a second optical fiber configured to propagate the light from the optical switch; and
    a second optical element configured to emit the light to the reference object and receive the second interference light incident from the reference object.

5. The system for correcting an optical path length measurement error according to claim 4, wherein the second optical element is a focuser or a collimator.

6. The system for correcting an optical path length measurement error according to claim 1,
    wherein the reference object is an etalon element, and
    the second optical unit includes a third optical element configured to emit the light to the etalon element, and a fourth optical element configured to receive transmitted light incident from the etalon element.

7. The system for correcting an optical path length measurement error according to claim 6, wherein the third optical element and the fourth optical element are focusers or collimators.

8. The system for correcting an optical path length measurement error according to claim 1, wherein the reference object includes a pair of opposing parallel flat plates.

9. The system for correcting an optical path length measurement error according to claim 8, wherein the inside of a space between the parallel flat plates is a vacuum.

10. The system for correcting an optical path length measurement error according to claim 8, wherein the reference object includes a reflective film on at least one of facing inner surfaces of the parallel flat plates.

11. The system for correcting an optical path length measurement error according to claim 8, wherein the pair of opposing parallel flat plates are formed of single crystal silicon.

12. The system for correcting an optical path length measurement error according to claim 1, further comprising a holder configured to hold a relative position between the second optical unit and the reference object.

13. A method of correcting an optical path length measurement error, the method comprising:
    a step of emitting light to a measurement target object and causing first interference light from the measurement target object to be incident on a spectroscope under a predetermined temperature environment;
    a step of calculating an optical path length of the measurement target object on the basis of the first interference light;
    a step of emitting the light to a reference object configured to have a constant optical path length with respect to a temperature fluctuation, and causing second interference light from the reference object to be incident on the spectroscope under the predetermined temperature environment;
    a step of calculating a measurement optical path length of the reference object on the basis of the second interference light;
    a step of acquiring a reference optical path length of the reference object;
    a step of calculating a fluctuation rate of the measurement optical path length with respect to the reference optical path length under the predetermined temperature environment on the basis of the measurement optical path length of the reference object calculated on the basis of the second interference light and the reference optical path length of the reference object; and
    a step of correcting the optical path length of the measurement target object on the basis of the fluctuation rate.

* * * * *